United States Patent [19]

Larsson et al.

[11] Patent Number: 4,978,554
[45] Date of Patent: Dec. 18, 1990

[54] MARGARINE, SPREADABLE AT REFRIGERATION TEMPERATURE, AND HAVING A VERY LOW FAT CONTENT AND METHOD OF MANUFACTURING SAME

[75] Inventors: Jan-Åke Larsson; Leif Johansson, both of Götene, Sweden

[73] Assignee: L & L International Sweden Aktiebolag, Stockholm, Sweden

[21] Appl. No.: 256,725

[22] Filed: Oct. 12, 1988

[30] Foreign Application Priority Data

Oct. 13, 1987 [SE] Sweden ................................ 8703976

[51] Int. Cl.$^5$ .............................................. A23D 7/00
[52] U.S. Cl. .................................... 426/604; 426/602; 426/603; 426/804
[58] Field of Search ................ 426/602, 603, 604, 804

[56] References Cited

FOREIGN PATENT DOCUMENTS 1074176  3/1980  Canada ................................. 426/603
2150586  7/1985  United Kingdom ................ 426/603

Primary Examiner—Donald E. Czaja
Assistant Examiner—Helen Pratt

[57] ABSTRACT

A low calorie margarine and a method of making same, which margarine has a fat content of 19–38% and manufactured by emulsification of a water phase in a fat phase to directly provide a water-in-oil emulsion, in which the water phase, as a main ingredient, comprises a protein concentrate, and in which the fat phase comprises 70–100% cured (hardened) fat and the remaining fat being uncured fat, and in which the water phase comprises a heat treated and ripened solution in skim milk, butter milk, whey, water or any mixture thereof of between 2 and 6% by weight of starch and between 0.02 and 0.05% by weight of an emulsifier, which solution, after having been heat treated and ripened, is mixed with about 55–60% by weight of a protein concentrate having a protein content of 12.8%, and the fat phase is composed of fats and between 0.75 and 1.25% by weight of a known emulsifier ordinarily used in this connection, and in which water-in-oil emulsion obtained by the emulsification of the water phase in the fat phase is pasteurized, cooled and packed.

26 Claims, No Drawings

MARGARINE, SPREADABLE AT REFRIGERATION TEMPERATURE, AND HAVING A VERY LOW FAT CONTENT AND METHOD OF MANUFACTURING SAME

For many years there has been an aim to provide a dairy spread or a margarine having a very low fat content. It is known from several publications to manufacture a margarine having a fat content of about 40%, for instance from applicant's own U.S. Pat. Nos. 3,922,376 (equivalent to SE No. 7216387-6) and 4,051,269 (equivalent to SE No. 7410940-6). In both cases, like when manufacturing low calorie margarines according to other methods, a water phase mainly comprising a protein contentrate and generally derived from butter milk or skim milk, is mixed into a fat phase under agitation, in some cases vigorous agitaton.

The main problem in the manufacture of low calorie margarines has been, and still is, to get an emulsion of the type water-in-oil, which is durable for a long period of time and which emulsion is so stable that the ready or final product can be pasteurized. Such pasteurization is considered necessary in view of the relatively large amount of liquid in the product and the following risk for bacterial contamination and following formation of mould in the product.

It is known to manufacture margarines of good quality and having fat contents down to about 40%, but there have been considerable difficulties to manufacture—in a full scale plant—high quality and durable margarines having less fat contents than 40%, especially margarines having such good stability that the final product can be pasteurized.

An object of the invention therfore is to solve the problem of manufacturing a margarine having a fat content of substantially less than 40% preferably a fat content of between 19 and 38%, which procuct has a good taste and consistency, which is spreadable at refrigeration temperature, which does still not become running at room temperature, and which has an emulsion which is so stable that the product can be pasteurized without breaking the emulsion (in the sense that the emulsion is phase inverted from W/O to O/W), and which product is microbiologically durable for a relative long period of time.

According to the invention this object is fulfilled by a method, in which there are prepared, separately from each other, both a fat phase comprising cured (hardened) and uncured fats, or only butter fat, and a slight amount of an emulsifier, and a water phase comprising a protein concentrate, an amount of milk, for instance skim milk, coulouring and aroma substances and an addition of starch, which starch addition highly contributes to the formation of the intented stable emulsion. The protein concentrate can be manufactured in any known way, for instance by a precipitation, or by a separation process, or by a membrane filtering process like ultra filtration, etc. The starch may preferably be solved in skim milk, butter milk, whey or water or any mixture or any concentrate thereof.

Starch is a product which mainly consists of amylose and amylopectine. Amylose is capable of binding water, and amylopectine has paste-forming properties. Both ingredients, having the said specific properties, are of considerable value in the manufacture of low calorie margarines. It can be said that a part of the fat content of the actual product has been substituted by starch.

The use of starch in the margarine does not give any noticable quality reduction or change of the taste, of the consistency or of the spreadability etc. as compared with such known low calorie margarines which have fat contents of about 40%. Starch is a chemically pure and harmless product which has already previously been used as a neutral inert filler of food stuffs, medicines and many other products. The advantages of using starch in this particular case both includes the possibility of reducing the fat content as far as to less than 20% and also reducing the costs for the raw materials for the product, since starch is a substantially cheaper product than cured (hardened) and uncured edible fats.

A special and new aspect of the invention is the possibility of controlling the storing consistency of the margarine without the need of using substituted starch. This is made in that the starch is combined with a slight amount of emulsifier forming complexes capable of preventing gel formation. If such gelification is not controlled the consistency of the product will become changed by time and the product will get a more and more rubber-like consistency.

A typical product according to the invention having a fat content of about 19–38% by weight can have the following average composition given in percent by weight of the ready/final product:

The fat phase: only cured fats or only uncured fats like butter oil, or for instance 16–24% cured fats and 1–6% uncured fats, and emulsifiers 0.75–1.25%;

The water phase: protein concentrate 55–60% (having a protein content of 12.8%), monoglycerides 0.02–0.05%, skim milk 5–15%, starch 2–6%, aromas and colouring substances 2–3%.

For the manufacture of the product it has been necessary to find a new method, which in the present case comprises five different steps, namely (I) Preparation of a starch solution, (II) Preparation of a water phase, (III) Preparation of a fat phase, (IV) Making an emulsion of the type water-in-oil, and (V) Finishing treatment of the emulsion.

I. Preparation of a starch solution

The preparation of the starch solution is split on two days. On the first day a starch solution is prepared by solving a starch powder and a slight amount of emulsifier like a monoglyceride in a solvent like skim milk, butter milk, whey, water or a mixture thereof. The solution will have to be left to swell (is pastified) and to become ripened for 24 hours; and on the second day the ready starch solution is used for the preparation of a water phase comprising a combination of starch, emulsifier and protein.

The starch preferably is a decomposed or converted starch which is commonly available on the market.

More exactly the preparation of the starch solution is made in that skim milk, butter milk, whey or a mixture thereof, eventually having an addition of water, is pasteurized at 72° C., whereupon 18–36 percent by weight of a starch powder and 0.2–0.3 percent by weight of a monoglyceride are admixed under vigorous stirring.

By using the combination of starch and an emulsifier forming a complexe it is possible to obtain the desired product.

The mixture is subjected to a strong heat treatment in that the mixture, preferably in direct connection to the mixing with the solvent, is heated to 85°–90°C. and is kept at this temperature for about 3–10 minutes, suitably about 5 minutes, whereupon the entire batch is cooled to 6°–10° or preferably about 8° C., and is allowed to stand to become thickened and ripened until the next day. The strong heat treatment of the milk with the admixed starch/emulsifier is necessary both for killing of bacteriae and also for providing a strong pastifying and solving of the starch. After the starch has been allowed to swell for 24 hours it is important that the vidcous mass is broken so as to present a smooth product. This can be made by means of a mixing machine, or the starch solution can be pumped through a mixing mill. It is thereby important to foresee that no air is admixed in the starch solution.

II. Preparation of the water phase

A protein concentrate is prepared, as known per se, from butter milk, skim milk or milk having unreduced content of milk fat, by bacterial or chemical precipitation, by membrane filtering, by evaporation-concentration of milk, by mixing of a casein solution, or any other known method, whereby it is foreseen that the protein content of the protein concentrate is about 12–14%. In the method which has been experienced in full scale by applicant the protein content of the protein concentrate was 12.8%, but it is to be noted that it is quite possible to give the protein concentrate another concentration degree. The protein containing "water phase" is heated to 45°–55° or preferably 47°–50°, and to the water phase is also added:

sodium chloride for taste reasons,
sodium hydroxide for neutralizing the acidic protein from a pH value of about 4.6 to pH about 6.4,
sodium phosphate and sodium citrate for acting as melting salts, and
potassium sorbate which acts as a means for preventing the formation of mould and for reducing the total amount of bacteriae of the product.

After the starch/emulsifier solution has swelled (pastified) for 24 hours, as mentioned above, the vicous mass thereof is broken and the milk/starch/emulsifier solution is heated to the same temperature as that of the water phase, and the milk/starch/emulsifier solution is added to the water phase while stirring the mixture. The mixture thereby has a temperature of 45°–55° C. or preferably 47°–50°, at which temperature the emulsification is intended to take place. Once again it is checked that the pH value of the mixture is about pH 6.2–6.6.

III. Preparation of the fat phase

In order to obtain a product having a good quality the amount of cured (hardened) fat must, depending on the large amount of water in the product to be made, be higher than is usual in low calorie margarines. It is for instance possible to use 70–100%, or preferably at least 85% cured animal or vegetable fat like butter oil, palm oil, cured soy oil, coconut oil, sunflower oil etc, and the remaining part being uncured vegetable or animal fats like palm oil, soy oil, coconut oil sunflower oil, colza oil etc. Apart from the fact that a somewhat higher amount of cured fats should be used than has been used in earlier low calorie dairy spreads which are spreadable at refrigeration temperature, a slightly higher amount of emulsifier has to be added than has been usual, for instance an addition of 0.75–1.25% emulsifier. Thus, 70–90% cured fat, for instance of the above mentioned type, is mixed, in melted condition, with 30–10% uncured fat, for instance of the above mentioned type and with 0.75–1.25% of a suitable emulsifier, as calculated on the ready product. Depending on what type of emulsifier is used said "fat phase emulsifier" may be added either additionally to the water phase or to the fat phase or to both. The emulsifiers are of known type, and hence they are not specifically examplified in the present connection.

Aroma substances like butter aroma etc. and colouring substances like beta carotene are also mixed into the fat phase. The fat phase is heated to a temperature which is slightly higher than the emulsification temperature for the water phase, for instance to a temperature of 48°–58° C.

IV. Preparation of a water in oil emulsion

The water phase, heated to about 45°–55° C., is successively mixed into the fat phase having a slightly higher temperature, and this is made under vigorous stirring. The emulsification can be made in a stirring apparatus of known type, or i several stirring apparatus connected in series. The water phase is from above poured into the fat phase, whereby the water phase is preferably allowed to pass one or several rapidly rotating propellers of the stirring apparatus. In a particularly preferred embodiment of the method three stirring apparatus are used which are connected in series, whereby the actual emulsification takes place in the first stirring apparatus, which is preferably formed with a stirring means that can be raised and lowered in relation to the mixture level in the emulsification tank, for instance a propeller stirring means which operates at a speed of about 2.400 rpm. The two following stirring apparatus which are formed with propellers rotating at a variable, preferably substantially less speed than that of the first stirring apparatus, are used to stir the emulsion and give same an intended smoothness without admixing air into the emulsion. The stirring in said two last mentioned stirring apparatus is preferably made under continuous inspection. In case of a correctly made emulsification an emulsion is obtained which normally has a slightly higher viscosity and conduction value than for known low calorie spreads having about 40% fat content. An emulsion of the water-in-oil type is directly obtained, and the resulting margarine is spreadable even at refrigeration temperature.

V. Finishing treatment of the emulsion

The emulsioned product obtained in step IV is, immediately after the emulsification, pasteurized at a temperature of about 80° C., for instance on a scraper pasteurizing apparatus, whereupon the emulsion is cooled to 13°–8° C., preferably to about 10° C. on a scraper cooler. Thereafter the emulsion is allowed to pass a treating step in the form of a so called "texturizer" which is a type of pin stirring apparatus operating at a relatively low speed, for instance 100–500 rpm, or preferably 200–300 rpm. Immediately after the "margarine" so obtained has been finally treated the product is packed in a container by means of a subsequent filling machine and is sealed in that a sealing foil is welded to the edges of the container in order to prevent the access air to the surface of the margarine. The sealing foil ought to be heated for eliminating the risk of introducing bacteriae in the container, and for further eliminating said risk of contamination the container with the packed goods can be flushed by means of nitrogenous gas or sterile air. This can even be considered necessary in view of the large content of water in the product. If the surface of the margarine becomes dried there is a miscolouring of the product. A sealed closing by means of a heated sealing foil minimizes the risk for formation of mould on the surface of the product. Eventually the sealing foil can be pressed to the surface of the margarine so as to expell any air. Mould generally follows with the air, and if there is no air at the surface of the product there is also no mould.

EXAMPLE 1

(30% fat content)

The manufacture of the margarine was initiated by making, on day 1, a starch solution in that 2.5% of a starch powder, as calculated on the ready emulsion, was solved under vigorous stirring in 7.5% skim milk, as calculated on the ready emulsion. The skim milk had been pasteurized at 72° C. To said mixture was added 0.025%, as calculated on the ready emulsion, of a monoglyceride. The mixture was heated to about 87° C. and said temperature was maintained for 5 minutes. Then the mixture was cooled to 8° C. and the batch was allowed to stand to swell (become pasted) and to become ripened until the next day, day 2.

Parallelly therewith a protein concentrate was prepared from acidified skim milk which was concentrated in a separation process to obtain a protein content of 12.8%. 57% of said protein concentrate was used. Day 2 the following was added to the protein concentrate: 1.2% sodium cloride, 0.2% sodium hydroxide, 0.28% sodium citrate, 0.26% sodium phosphate and 0.11% potassium sorbate. The pH value was adjusted to pH 6.4.

On day 2 also a fat phase was prepared comprising 23.25% butter oil, 5.81% soy oil, 0.15% colouring substance, 0.018% butter aroma and 0.75% emulsifier, all as calculated on the ready emulsion.

On day 2 also the protein concentrate with its additions was admixed, under stirring, in the starch solution. It was checked that the pH was at about 6.4. The water phase thereby formed was heated to 48° C. At the same time the fat phase with its additions was heated to 50° C. and the water phase was successively and under intense stirring mixed into the fat phase. During the entire mixing process it was observed that the correct emulsion (water-in-oil) was directly obtained and that the emulsion received the consistency and smoothness which was desired for the ready product. The ready emulsion was pasteurized at 80° C. on a scraper pasteurizing apparatus and was then cooled to 10° C., whereupon the product was passed through a finishing working machine having slowly rotating wings, 250 rpm, in which the margarine was finishing-kneaded. The treatment was processed so that no air was introduced in the product. Directly following said finishing treatment the product was packed in containers which were sealed by means of a heated sealing foil.

The ready product proved to have a good taste and consistency and it was judged, by a taste panel, to have the same good properties as low calorie spreads of the type comprising 40% fat or more. The product also has a good storing ability, and it was tested after 8 weeks of storing in packed condition at refrigeration temperature. It did not show any change of taste or consistency, no drying and no bacterial attacks. The final composition of the product is evident from the table at the end of the specification.

For the purpose of investigating how low fat content might be sued for a margarine of this type the following three examples were made, in which the fat contents were 25%, 20% and 17.5% respectively.

EXAMPLE 2

(25% fat content)

The method of example 1 was repeated but for the difference that the fat content was 25%, emanating from 20.18% butter oil and 3.56% soy oil. The amount of starch was increased to 3.75%, the skim milk to 11.25%, the monoglyceride to 0.0375% and the emulsifier to 1.0%. Otherwise the method was like in example 1, and also in the present example a product was obtained which had a good taste, a good consistency and a good storing durability (at least 8 weeks).

EXAMPLE 3

(20% fat content)

The same method as in example 1 was repeated whereby the fat content was 20% emanating from 16.58% butter oil and 1.85% soy oil. The amount of starch was correspondingly increased to 5.0%, the skim milk to 15%, the monoglycerides to 0.05% and the emulsifier to 1.25%.

There were slight problems with the emulsification and the emulsion had a tendency to break into the non-desired oil-in-water emulsion. The taste and the texture and consistency of the product was acceptable but not quite on line with those of examples 1 and 2. The storing ability of the product was acceptable, but due to the high amount of liquid the product proved to have a tendency of "sweating" and consequently there was a risk of contamination and drying of the surface.

EXAMPLE 4

(17.5% fat content)

The same method as in example 1 was repeated but in this case the fat content was only 17.5%, emanating from 14.9% butter oil, 1.0% soy oil, 1.3% emulsifier, 0.3% colouring substance and 0.025% butter aroma.

There were great difficulties in obtaining an emulsion of the water-in-oil type, and when storing the product there was a tendency that the emulsion became broken into the non-desired oil-in-water emulsion.

In several successive tests with the same conditions there were in some cases obtained a product of the desired type (W/O) but in most cases an emulsion of the wrong type (O/W) was obtained, or the emulsion became broken after some time. The product did not have the intended quality, and the taste and consistency were not quite satisfactory. It was established that a fat content of about 19% was the lower limit for the fat content of a product according to the present invention.

EXAMPLE V (30% fat content)

The same process as in example 1 was repeated but with the difference that the milk/starch mixture was not heat treated. It proved that the starch did not get the desired emulsifying and liquid absorbing properties, and that it was not possible to manufacture an emulsion of the type water-in-oil.

EXAMPLE VI (30% fat content)

The same process as in example 1 was repeated but with the difference that the milk/starch/emulsifier mixture was heated only to 50° C. and was kept at this temperature for 10 minutes before it was cooled to about 8° C. There were no actual problems in obtaining the desired water-in-oil emulsion, but the product was considered slightly grainy and was not considered acceptable.

EXAMPLE VII (25% fat content)

The same process as in example 1 was repeated but with the difference that the fat content was only 25% and that all of the fat was milk fat, i.e. butter oil. The product had good taste and consistency, and it was spreadable at refrigeration temperature, even if the viscosity was somewhat higher than for the product of example 1.

It is very well possible, within the scope of the invention, to pre-treat the starch and to successively or batchwise use said pretreated starch (instant starch) in the method. This may simplify the process in dairy industries which do not have the necessary equipment for the preparation of the starch solution.

EXAMPLE VIII (30-40% fat content)

In order to investigate at what fat content it is necessary to add starch in order to get a stable, durable emulsion of the water-in-oil type a series of tests was made without the addition of starch but otherwise exactly like in example 1 and with the same ingredients as in example 1.

It proved that it was not at all possible, by using the described method, to obtain an emulsion of the intended type with fat contents of up to about 38%, but from said limit and further up there were no serious problems in obtaining the intended emulsion, and it thereby could be established that the upper limit of the invention was at about 38% fat content.

TABLE

| Example | 1 | 2 | 3 | 4 | 5 | 6 | 7 |
| --- | --- | --- | --- | --- | --- | --- | --- |
| Content (%): fat content | 30 | 25 | 20 | 17.5 | 30 | 30 | 25 |
| Water Phase | | | | | | | |
| protein conc. | 57 | 55 | 55 | 57 | 54 | 57 | 55 |
| starch | 2.5 | 3.75 | 5.0 | 5.0 | 2.5 | 2.5 | 3.75 |
| NaCl | 1.2 | 1.2 | 1.2 | 1.2 | 1.2 | 1.2 | 1.2 |
| NaOH | 0.1 | 0.1 | 0.2 | 0.2 | 0.2 | 0.2 | 0.2 |
| Na-citrate | 0.28 | 0.28 | 0.28 | 0.28 | 0.28 | 0.28 | 0.28 |
| Na-phosphate | 0.26 | 0.26 | 0.26 | 0.26 | 0.26 | 0.26 | 0.26 |
| K-sorbate | 0.11 | 0.11 | 0.11 | 0.11 | 0.11 | 0.11 | 0.11 |
| skim milk | 7.5 | 11.25 | 15.0 | 11.25 | 7.5 | 7.5 | 11.00 |
| monoglycerides | 0.025 | 0.0375 | 0.05 | 0.0275 | 0.025 | 0.025 | 0.03 |
| Fat Phase | | | | | | | |
| cured fat | 23.25 | 10.18 | 16.58 | 14.9 | 23.25 | 23.25 | 12.74 |
| uncured fat | 5.81 | 3.56 | 1.85 | 1.0 | 5.81 | 5.82 | — |
| aromas | 0.018 | 0.02 | 0.022 | 0.025 | 0.018 | 0.018 | 0.02 |
| emulsifiers | 0.75 | 1.0 | 1.25 | 1.3 | 0.75 | 0.75 | 1.0 |
| colouring | 0.15 | 0.15 | 0.15 | 0.15 | 0.15 | 0.15 | 0.15 |
| water | — | 2.0 | 2.0 | — | 2.0 | — | 2.0 |
| Evaluation:(*) | | | | | | | |
| taste | 5 | 4 | 4 | 3 | 4 | 2 | 5 |
| spreadability | 5 | 5 | 3 | 1 | 2 | 0 | 4 |
| durability | 5 | 4 | 2 | 0 | 0 | 0 | 4 |

(*) according to a 5-grade scale

We claim:

1. A low-calorie margarine having a fat content of between 19 and 38% by weight, said low-calorie margarine comprising, as calculated on the basis of the final product:
    a water phase having a protein concentrate as a main ingredient, said water phase further comprising a heat treated and ripened solution of between 2 and 6% by weight of starch and between 0.02 and 0.05% by weight of an emulsifier solubilized in a solvent, which solution, after having been heat treated and ripened, is mixed with about 55-60% by weight of a protein concentrate having a protein content of 12-14%, and
    a fat phase comprising cured fats or a mixture of cured fats and uncured fats and an emulsifier, said fat phase comprising fats in a content of between 19 an 38% by weight and between 0.75 and 1.25% by weight of said emulsifier, and wherein
    said low calorie margarine is manufactured by emulsification of said water phase in said fat phase to directly provide a water in oil emulsion which is pasteurized, cooled and packed.

2. The low-calorie margarine of claim 1 wherein said solvent is selected from the group consisting of skim milk, butter milk, whey, water and mixtures thereof.

3. The low-calorie margarine of claim 1 wherein said solvent comprises between 7.5 and 15% of a milk product as calculated on the basis of the final product selected from the group consisting of skim milk, butter milk, whey, and mixtures thereof, and wherein said solution has or does not have additional water.

4. The low-calorie margarine of claim 1 wherein said starch is a decomposed starch in powder form.

5. The low-calorie margarine of claim 1 further comprising sodium hydroxide for adjusting the pH of the product to about 6.4, sodium phosphate and sodium citrate as melting salts and potassium sorbate as an antimould substance, each of said ingredients in amounts of less than 0.5%.

6. The low-calorie margarine of claim 3 wherein said starch is a decomposed starch supplied in powder form.

7. The low-calorie margarine of claim 3 further comprising sodium hydroxide for adjusting the pH of the product to about 6.4, sodium phosphate and sodium citrate as melting salts and potassium sorbate as an antimould substance, each of said ingredients in amounts of less than 0.5% as calculated on the basis of the final product.

8. The low-calorie margarine of claim 4 further comprising sodium hydroxide for adjusting the pH of the product to about 6.4, sodium phosphate and sodium citrate as melting salts and potassium sorbate as an antimould substance, each of said ingredients in amounts of less than 0.5% as calculated on the basis of the final product.

9. A method for the manufacture of a low-calorie margarine having a fat content of between 19 and 38% by weight, said method comprising the steps of:
    preparing in a first stage a solution by mixing while stirring starch and a first emulsifier in a solvent;
    allowing the starch/first emulsifier solution to stand for a period of time sufficient for the solution to swell and to become ripened;
    mixing the ripened starch/first emulsifier solution with a protein concentrate from a milk product and with melting salts and taste giving substances to form a water phase;
    separately preparing a fat phase composed of fats and oils and a second emulsifier;
    successively emulsifying the water phase in the fat phase to directly provide a water-in-oil emulsion;
    pasteurizing, and cooling the emulsion thereby formed;
    and packing the emulsion so as to be sealed and protected.

10. The method of claim 9 further comprising the steps of:
   heating the starch/first emulsifier solution before the admixing of the protein concentrate to a temperature between 85°–90° C.;
   maintaining the solution at said temperature for 3–10 minutes;
   cooling the solution to 6°–10° C., and
   allowing the solution to stand to swell and become ripened.

11. The method of claim 10 further comprising the steps of:
   treating the starch/first emulsifier solution after it has swelled and become ripened in a mixer or stirring apparatus, without mixing any air into the solution, to form the solution quite smooth;
   mixing the protein concentrate into the starch/first emulsifier solution, and
   emulsifying the water phase in the fat phase wherein said water phase is at a temperature between 45° and 55° C. and said fat phase is at a slightly higher temperature.

12. The method of claim 9 wherein said fat phase comprises 70–100% cured fat, or fats, the remaining amount of fat being uncured fat or fats, and 0.75–1.25% by weight of said second emulsifier.

13. The method of claim 9 wherein the water-in-oil emulsion is pasteurized at about 80° C. and then cooled to between 8°–13° C., and the step of subjecting the emulsion to final treatment is further characterized in that said emulsion is treated in a kneading mill rotating at a speed of 100–300 rpm.

14. The method of claim 9 wherein the step of emulsifying the water phase in the fat phase comprises the substeps of:
   emulsifying the water phase in the fat phase in a first stirring apparatus operating at a high speed, and
   stirring the emulsion in one or more succeeding stirring apparatus operating at variable speeds, wherein the emulsion is stirred at a speed without any admixing of air into the product.

15. The method of claim 10 wherein the water-in-oil emulsion is pasteurized at about 80° C. and then cooled to between 8°–13° C., and the step of subjecting the emulsion to final treatment is further characterized in that said emulsion is treated in a kneading mill rotating at a speed of 100–300 rpm.

16. The method of claim 11 wherein the water-in-oil emulsion is pasteurized at about 80° C. and then cooled to between 8°–13° C., and the step of subjecting the emulsion to final treatment is further characterized in that said emulsion is treated in a kneading mill rotating at a speed of 100–300 rpm.

17. The method of claim 12 wherein the water-in-oil emulsion is pasteurized at about 80° C. and then cooled to between 8°–13° C., and the step of subjecting the emulsion to final treatment is further characterized in that said emulsion is treated in a kneading mill rotating at a speed of 100–300 rpm.

18. The method of claim 10 wherein the step of emulsifying the water phase in the fat phase comprises the substeps of:
   emulsifying the water phase in the fat phase in a first stirring apparatus operating at a high speed, and
   stirring the emulsion in one or more succeeding stirring apparatus operating at variable speeds, wherein the emulsion is stirred at a speed without any admixing of air into the product.

19. The method of claim 11 wherein the step of emulsifying the water phase in the fat phase comprises the substeps of:
   emulsifying the water phase in the fat phase in a first stirring apparatus operating at a high speed, and
   stirring the emulsion in one or more succeeding stirring apparatus operating at variable speeds, wherein the emulsion is stirred at a speed without any admixing of air into the product.

20. The method of claim 12 wherein the step of emulsifying the water phase in the fat phase comprises the substeps of:
   emulsifying the water phase in the fat phase in a first stirring apparatus operating at a high speed, and
   stirring the emulsion in one or more succeeding stirring apparatus operating at variable speeds, wherein the emulsion is stirred at a speed without any admixing of air into the product.

21. The method of claim 13 wherein the step of emulsifying the water phase in the fat phase comprises the substeps of:
   emulsifying the water phase in the fat phase in a first stirring apparatus operating at a high speed, and
   stirring the emulsion in one or more succeeding stirring apparatus operating at variable speeds, wherein the emulsion is stirred at a speed without any admixing of air into the product.

22. The method of claim 9 wherein said solvent is selected from the group consisting of skim milk, butter milk, whey, water and mixtures thereof.

23. The method of claim 9 wherein said solvent comprises between 7.5 and 15% of a milk product selected from the group consisting of skim milk, butter milk, whey, and mixtures thereof, and wherein said solution has or does not have additional water.

24. The method of claim 9 wherein said starch is a decomposed starch in powder form.

25. The method of claim 9 further comprising sodium hydroxide for adjusting the pH of the product to about 6.4, sodium phosphate and sodium citrate as melting salts and potassium sorbate as an anti-mould substance, each of said ingredients in amounts of less than 0.5%.

26. The method of claim 9 wherein the step of allowing the starch/first emulsifier solution to stand for a period of time is further characterized in that said solution is allowed to stand for a day and a night.

* * * * *